US012459363B2

United States Patent
Oya et al.

(10) Patent No.: US 12,459,363 B2
(45) Date of Patent: Nov. 4, 2025

(54) BATTERY ELECTRIC VEHICLE

(71) Applicant: TOYOTA JIDOSHA KABUSHIKI KAISHA, Toyota (JP)

(72) Inventors: Ryosuke Oya, Toyota (JP); Ippei Takesue, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 153 days.

(21) Appl. No.: 18/410,204

(22) Filed: Jan. 11, 2024

(65) Prior Publication Data

US 2024/0317059 A1     Sep. 26, 2024

(30) Foreign Application Priority Data

Mar. 24, 2023   (JP) ................ 2023-048695

(51) Int. Cl.
*B60L 1/08* (2006.01)
*B60L 58/27* (2019.01)
(52) U.S. Cl.
CPC ............. *B60L 1/08* (2013.01); *B60L 58/27* (2019.02); *B60L 2240/36* (2013.01)
(58) Field of Classification Search
None
See application file for complete search history.

(56) References Cited

U.S. PATENT DOCUMENTS

| | | | | |
|---|---|---|---|---|
| 2007/0029986 A1* | 2/2007 | Nakamura | ............ | B60L 50/16 323/318 |
| 2010/0089669 A1* | 4/2010 | Taguchi | ............ | B60L 58/15 180/65.1 |
| 2011/0031937 A1* | 2/2011 | Bito | ............ | B60W 10/26 320/150 |
| 2015/0153416 A1* | 6/2015 | Umemura | ............ | H02J 7/0031 320/107 |
| 2020/0361323 A1* | 11/2020 | Chon | ............ | H02M 7/44 |
| 2020/0376967 A1* | 12/2020 | Furukawa | ............ | B60L 50/61 |
| 2023/0282900 A1* | 9/2023 | Onuki | ............ | H05B 6/06 219/490 |

(Continued)

FOREIGN PATENT DOCUMENTS

| CN | 212289526 U | * | 1/2021 | |
|---|---|---|---|---|
| EP | 4371805 A1 | * | 5/2024 | ............ B60L 53/62 |

(Continued)

OTHER PUBLICATIONS

Text of CN212289526U (Year: 2021).*

*Primary Examiner* — Daniel L Greene
(74) *Attorney, Agent, or Firm* — SoraIP, Inc.

(57) ABSTRACT

A battery electric vehicle includes a battery, an inverter having three arm circuits, a motor having three coils connected to a neutral point and three arm circuits, a relay, a ground wire, and a controller. The controller can selectively perform a normal charging operation and a heat generation charging operation. In normal charging operation, equal current flows in all three coils in the positive direction from the neutral point to the arm circuit. In the heat generation charging operation, a first current flows in the positive direction in at least one of the three coils, and a second current flows in the opposite direction from the arm circuit toward the neutral point in the other coils. The total value of the first currents is greater than the total value of the second currents.

5 Claims, 4 Drawing Sheets

(56) References Cited

U.S. PATENT DOCUMENTS

2024/0190258 A1\* 6/2024 Dobmeier ............. B60L 15/007
2025/0042300 A1\* 2/2025 Nagai .................... B60L 50/16

FOREIGN PATENT DOCUMENTS

| EP | 4400352 A1 | \* | 7/2024 | ............. B60K 11/02 |
| JP | 9-322413 | \* | 6/1996 | ............. Y02T 10/70 |
| JP | 2010119282 A | \* | 5/2010 | ............. B60L 58/27 |
| JP | 2011-036070 A | | 2/2011 | |

\* cited by examiner

BATTERY ELECTRIC VEHICLE

CROSS-REFERENCE TO RELATED APPLICATION

This application claims priority to Japanese Patent Application No. 2023-048695 filed on Mar. 24, 2023, incorporated herein by reference in its entirety.

BACKGROUND

1. Technical Field

The technology disclosed herein relates to a battery electric vehicle that includes a battery, an inverter, and an electric motor.

2. Description of Related Art

Japanese Unexamined Patent Application Publication No. 2011-36070 (JP 2011-36070 A) discloses a technology that can warm a battery using a heater during charging.

SUMMARY

The technology disclosed in JP 2011-36070 A requires a heater itself and a space for installing the heater, which may increase the manufacturing cost and increase the physical size.

An aspect of the present disclosure provides a battery electric vehicle including a battery. The battery electric vehicle includes an inverter that includes three arm circuits. In each of the three arm circuits, an upper switching element connected to a positive electrode of the battery and a lower switching element connected to a negative electrode of the battery are connected in series. The battery electric vehicle includes a motor that includes three coils. One end of each of the three coils is connected to a neutral point, and another end of each of the three coils is connected to a midpoint of a corresponding one of the three arm circuits. The battery electric vehicle includes a relay that connects between the neutral point and a positive electrode of an external power supply. The battery electric vehicle includes a ground wire that connects between the negative electrode of the battery and a negative electrode of the external power supply. The battery electric vehicle includes a controller configured to perform control so as to independently turn on and off three lower switching elements and three upper switching elements, and to be capable of charging the battery by boosting a voltage of the external power supply. The controller is capable of selectively executing normal charging operation and heat generation charging operation. In the normal charging operation, an equal current flows in all the three coils in a positive direction from the neutral point toward the arm circuit. In the heat generation charging operation, a first current flows in the positive direction in at least one of the three coils, and a second current flows in an opposite direction from the arm circuit toward the neutral point in another coil of the three coils. A total value of the first current is greater than a total value of the second current.

According to such a configuration, the first current can be caused to flow in the forward direction and the second current can be caused to flow in the opposite direction through the heat generation charging operation. This allows the loss to be increased compared to the normal charging operation, thereby promoting heat generation in the inverter and the motor. Since heat can be generated using existing parts without separately providing a heater, it is possible to suppress an increase in the manufacturing cost and an increase in the physical size.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

In one embodiment of the present technology, the controller may turn on and off the lower switching elements in all three arm circuits when performing a normal charging operation. When performing the heat generation charging operation, the controller controls the lower switching element in at least one of the three arm circuits to turn on and off, and also controls the upper switching element in the other arm circuit of the three arm circuits to turn on and off. good. According to such a configuration, the same current in the positive direction can be passed through all three coils during normal charging operation. Further, in the heat generation charging operation, the first current and the second current can be passed.

In one embodiment of the present technology, the controller rotates the at least one coil through which the first current flows and the other coil through which the second current flows among the three coils during the performance of the heat generation charging operation. You may switch. According to such a configuration, the coil that generates the largest amount of heat can be switched in order among the three coils. It becomes possible to continue the heat generation charging operation while preventing the coil temperature from exceeding the upper limit value.

An embodiment of the present technology may further include a temperature sensor that measures the temperature of the battery. The controller may obtain acceptable power for the battery based on the temperature of the battery. The controller may perform the heat generation charging operation when the outputtable power of the external power source is greater than the acceptable power. According to such a configuration, when the acceptable power is limited depending on the battery temperature, it is possible to appropriately charge the battery by performing the heat generation charging operation.

An embodiment of the present technology may further include a thermal management system capable of transferring heat of the motor and inverter to the battery. According to such a configuration, it is possible to appropriately heat the battery using the amount of heat generated by existing components such as the inverter and the motor.

Configuration of Battery Electric Vehicle 2

Figure 1:
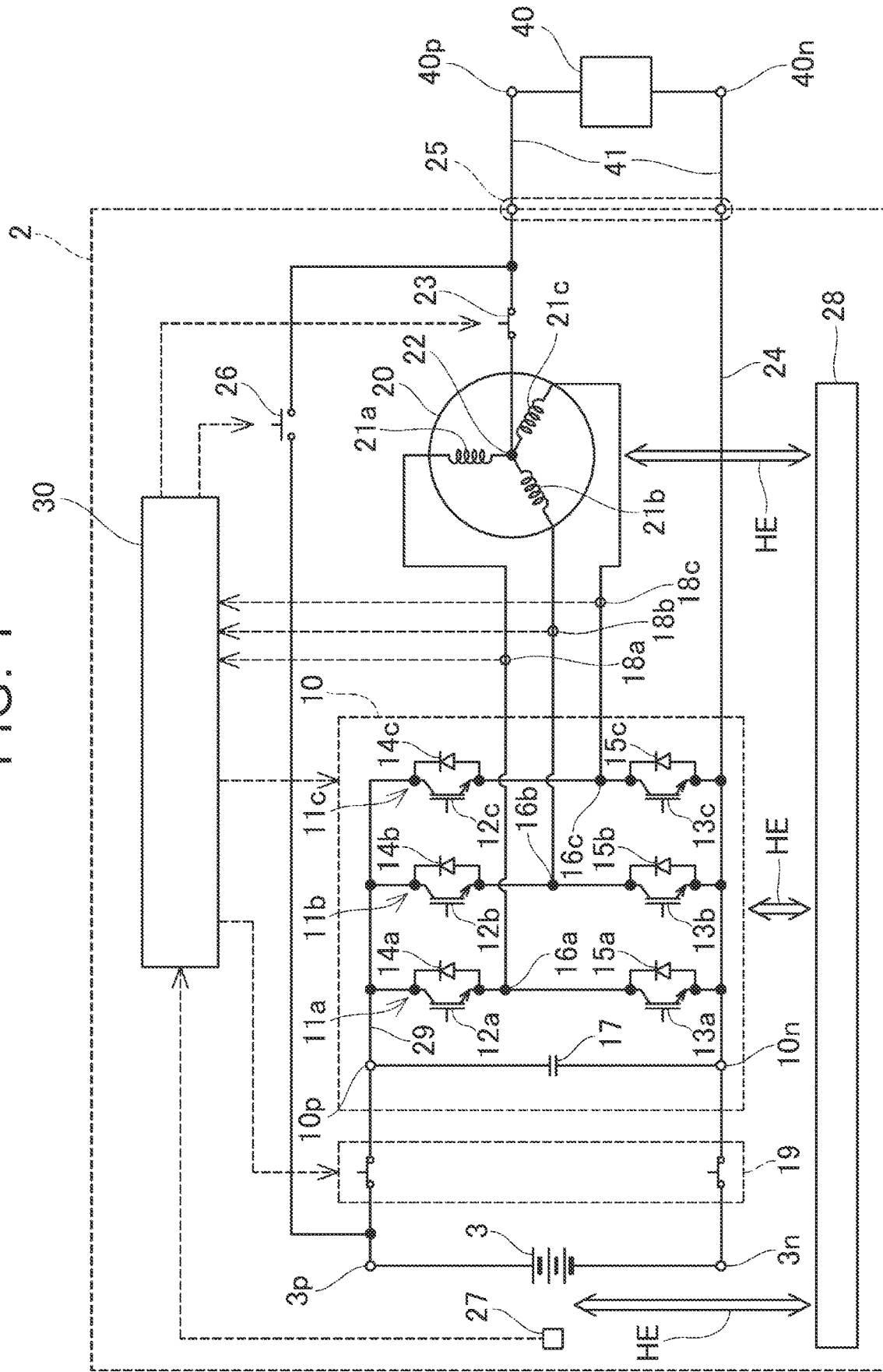
FIG. 1 is a block diagram of a battery electric vehicle 2 according to an embodiment.

A battery electric vehicle 2 according to an embodiment will be described with reference to the drawings. FIG. 1 shows a block diagram of a battery electric vehicle 2. The battery electric vehicle 2 mainly includes a battery 3, an inverter 10, an electric motor 20 for driving, and a controller 30. The broken arrow lines in FIG. 1 represent signal lines.

Battery 3 is connected to the DC end of inverter 10. A positive electrode 3*p* of the battery 3 is connected to a DC end positive electrode 10*p*, and a negative electrode 3*n* of the battery 3 is connected to a DC end negative electrode 10*n*. A main relay 19 is connected between the battery 3 and the inverter 10. Main relay 19 is controlled by controller 30.

The inverter 10 includes three sets of arm circuits 11*a*, 11*b*, and 11*c*. The arm circuit 11*a* includes an upper switching element 12*a*, a lower switching element 13*a*, a diode 14*a* connected in antiparallel to the upper switching element 12*a*, and a diode 15*a* connected to the lower switching element 13*a*. The upper switching element 12*a* and the lower switching element 13*a* are connected in series. The upper switching element 12*a* is connected to the positive electrode 3*p* of the battery 3 via the high-potential wiring 29 and the DC end positive electrode 10*p*. The lower switching element 13*a* is connected to the negative electrode 3*n* of the battery 3 via the ground wire 24 and the DC end negative electrode 10*n*. In other words, the upper switching element 12*a* and the lower switching element 13*a* are connected in series such that the upper switching element 12*a* is located on the high potential side and the lower switching element 13*a* is located on the low potential side.

Arm circuits 11*b* and 11*c* have the same structure as arm circuit 11*a*, so a description thereof will be omitted. The three sets of arm circuits 11*a*, 11*b*, and 11*c* are connected in parallel between the DC end positive electrode 10*p* and the DC end negative electrode 10*n* of the inverter 10. In other words, the three sets of arm circuits 11*a*, 11*b*, and 11*c* are connected in parallel between the positive electrode 3*p* and negative electrode 3*n* of the battery 3.

A capacitor 17 is connected between the DC end positive electrode 10*p* and the DC end negative electrode 10*n* of the inverter 10. Capacitor 17 is provided to suppress ripples in the current flowing to the DC end of inverter 10.

The upper switching elements 12*a*-12*c* and the lower switching elements 13*a*-13*c* of the inverter 10 are appropriately controlled by a controller 30. When the upper switching element and the lower switching element are alternately turned on and off, alternating current is output from the respective midpoints 16*a*, 16*b*, and 16*c* of the three sets of arm circuits 11*a*, 11*b*, and 11*c*.

An electric motor 20 is connected to the midpoints 16*a*, 16*b*, and 16*c*. The electric motor 20 includes three coils 21*a*, 21*b*, and 21*c*. The three coils 21*a*, 21*b*, and 21*c* are wound around a stator (not shown) of the electric motor 20. One end of each of the three coils 21*a*, 21*b*, and 21*c* is connected to each of the three midpoints 16*a*, 16*b*, and 16*c*. The other ends of the three coils 21*a*, 21*b*, and 21*c* are connected at one point. The point where the other ends of the three coils 21*a*, 21*b*, and 21*c* are connected to each other is called a neutral point 22. The configuration in which the other ends of the coils of each phase of the stator are connected at the neutral point 22 is called star coupling, and is a well-known circuit structure for three-phase AC motors.

The battery electric vehicle 2 further includes a charging relay 23, a ground wire 24, a charging inlet 25, a bypass relay 26, a temperature sensor 27, and a thermal management system 28. The charging relay 23 is a relay that connects the neutral point 22 to the positive electrode 40*p* of the external DC power supply 40. The ground wire 24 is a wiring that connects the negative electrode 40*n* of the external DC power supply 40 to the negative electrode 3*n* of the battery 3 via the inverter 10. External DC power supply 40 is, for example, a charging stand. The charging inlet 25 is provided in the body of the battery electric vehicle 2. A power cable 41 extending from an external DC power supply 40 is connected to the charging inlet 25. Thereby, external DC power supply 40 is connected to charging relay 23 and ground wire 24.

The bypass relay 26 is a relay that directly connects the positive electrode 40*p* of the external DC power supply 40 to the positive electrode 3*p* of the battery 3. Temperature sensor 27 is a sensor that measures the temperature of battery 3. The measured value of the temperature sensor 27 is sent to the controller 30.

The thermal management system 28 is a system that integrally controls all components such as the battery 3, the inverter 10, the electric motor 20, and an air conditioner (not shown) at an optimal temperature. That is, the thermal management system 28 controls heat exchange HE between each component via the refrigerant (see thick arrows in FIG. 1). Thereby, for example, exhaust heat from the inverter 10 and the electric motor 20 is recovered and transferred to the battery 3, thereby making it possible to heat the battery 3.

The battery electric vehicle 2 further includes three current sensors 18*a*, 18*b*, and 18*c* that measure the current flowing through each of the three coils 21*a*-21*c*. The measured values of the three current sensors 18*a*-18*c* are sent to the controller 30. The controller 30 performs feedback control of the upper switching elements 12*a*-12*c* and the lower switching elements 13*a*-13*c* using the measured values of the three current sensors 18*a*-18*c*. Specifically, current control type PWM control is performed. This allows the current flowing through each of the three coils 21*a*-21*c* to follow the target current value. Note that the current sensor 18 may be placed not at the position shown in FIG. 1 but at another position. Further, instead of the current sensor 18, each switching element may have a function of measuring current.

Boost Circuit Using Electric Motor 20

From a different perspective, it can be seen that the lower switching element 13*a*, diode 14*a*, and coil 21*a* of the inverter 10 constitute a booster circuit. At this time, the neutral point 22 corresponds to the input end, and the DC end positive electrode 10*p* of the inverter 10 corresponds to the output end. The positive electrode 40*p* of the external DC power supply 40 is connected to the neutral point 22 (input end), and the positive electrode 3*p* of the battery 3 is connected to the DC end positive electrode 10*p* (output end). A negative electrode 3*n* of the battery 3 is connected to a DC end negative electrode 10*n* of an external DC power supply 40 via a ground wire 24.

When the lower switching element 13*a* is turned on for a predetermined short period of time, one end of the coil 21*a* is connected to the ground wire 24, and current flows through the coil 21*a*. At this time, electrical energy is stored in the coil 21*a*. When the lower switching element 13*a* is switched from on to off, the current flowing from the coil 21*a* to the ground wire 24 stops. An induced electromotive force is generated in the coil 21*a*. Due to the induced electromotive force in the coil 21*a*, a current flows from the coil 21*a* to the DC end positive electrode 10*p* through the diode 14*a*. That is, the voltage at the DC end positive electrode 10*p* becomes higher than the voltage at the neutral point 22. When the voltage of the DC end positive electrode 10*p* becomes higher than the voltage of the positive electrode 3*p* of the battery 3, current flows from the external DC power supply 40 to the battery 3, and the battery 3 is charged.

The lower switching element 13*b*, coil 21*b*, and diode 14*b* also constitute a booster circuit. The lower switching element 13*c*, the coil 21*c*, and the diode 14*c* also constitute a booster circuit. That is, from a different perspective, the inverter 10 and the electric motor 20 can be considered as three step-up circuits connected in parallel.

The battery electric vehicle 2 can charge the battery 3 with an external DC power supply 40 whose output voltage is lower than that of the battery 3 by using the inverter 10 and the electric motor 20 as a boost circuit.

Normal Charging Operation and Thermal Charging Operation

The controller 30 can selectively perform a normal charging operation and a heat generation charging operation. When performing these operations, the charging relay 23 is closed, the positive electrode 40p is connected to the neutral point 22, and the negative electrode 40n is connected to the negative electrode 3n of the battery 3 via the ground wire 24. The output voltage of external DC power supply 40 may be lower than the output voltage of battery 3.

The controller 30 also determines the value of the charging current CI to the battery 3. The value of charging current CI is determined so as not to exceed the allowable charging current value of battery 3. The allowable charging current value can be calculated based on the temperature of the battery 3 measured by the temperature sensor 27, for example.

Figure 2:
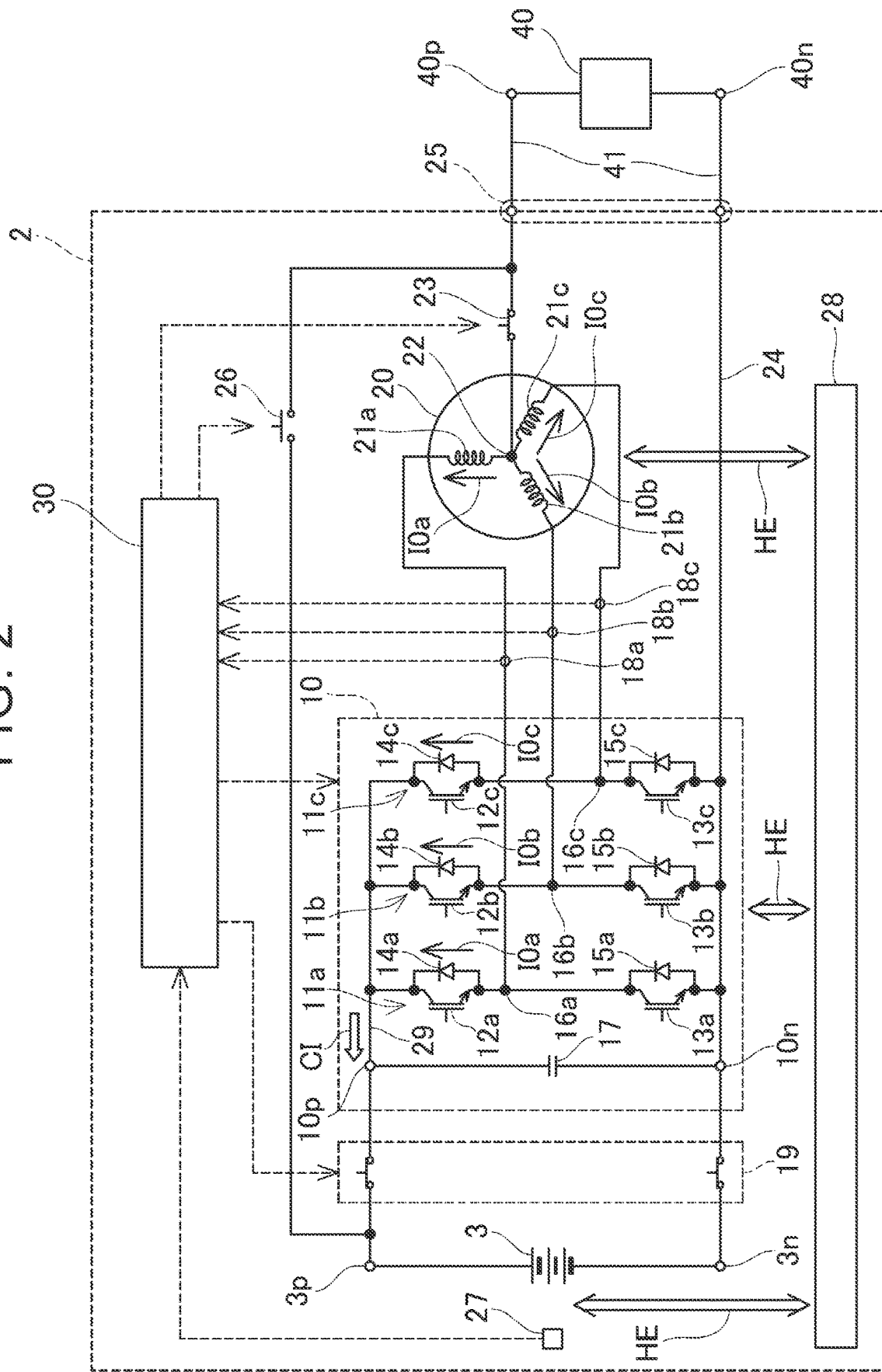
FIG. 2 is a block diagram illustrating normal charging operation.

The normal charging operation will be explained using FIG. 2. Note that in FIG. 2, the thickness of the arrow indicating the current indicates the magnitude of the current value. In normal charging operation, the controller 30 controls currents I0a-I0c to flow through the three coils 21a-21c. Currents I0a-I0c are currents flowing in the positive direction (charging direction) from the neutral point 22 toward the arm circuits 11a-11c. Further, the values of the currents I0a-I0c are all equal, and are the values obtained by dividing the charging current CI into three equal parts.

In the normal charging operation, the controller 30 appropriately controls 20 on/off the lower switching elements 13a-13c in all three arm circuits 11a-11c. As a result, the three booster circuits perform boosting operations in parallel. Note that at this time, the upper switching elements 12a to 12c may be controlled to be turned on or off as appropriate.

Currents I0a-I0c flow into the DC end positive electrode 10p via diodes 14a-14c. Currents I0a-I0c merge to become charging current CI and flow to battery 3. That is, the battery 3 is charged by the external DC power supply 40. Since current flows through the three coils 21a-21c at the same timing and in the same direction, the electric motor 20 does not output torque. In one example, charging current CI is 200 A and current I0a-I0c is approximately 66A.

The heat generation charging operation will be explained using FIG. 3. Note that in FIG. 3, explanations of parts similar to those in FIG. 2 will be omitted. In the heat generation charging operation, the controller 30 performs control so that the first current I1 flows in at least one of the three coils 21a to 21c, and the second current I2 flows in the remaining coils. The first current I1 is a current flowing in the positive direction (charging direction). The second current I2 is a current flowing in the opposite direction (discharging direction) from the arm circuits 11a-11c toward the neutral point 22. Further, the total value of the first current I1 is larger than the total value of the second current I2.

Figure 3:
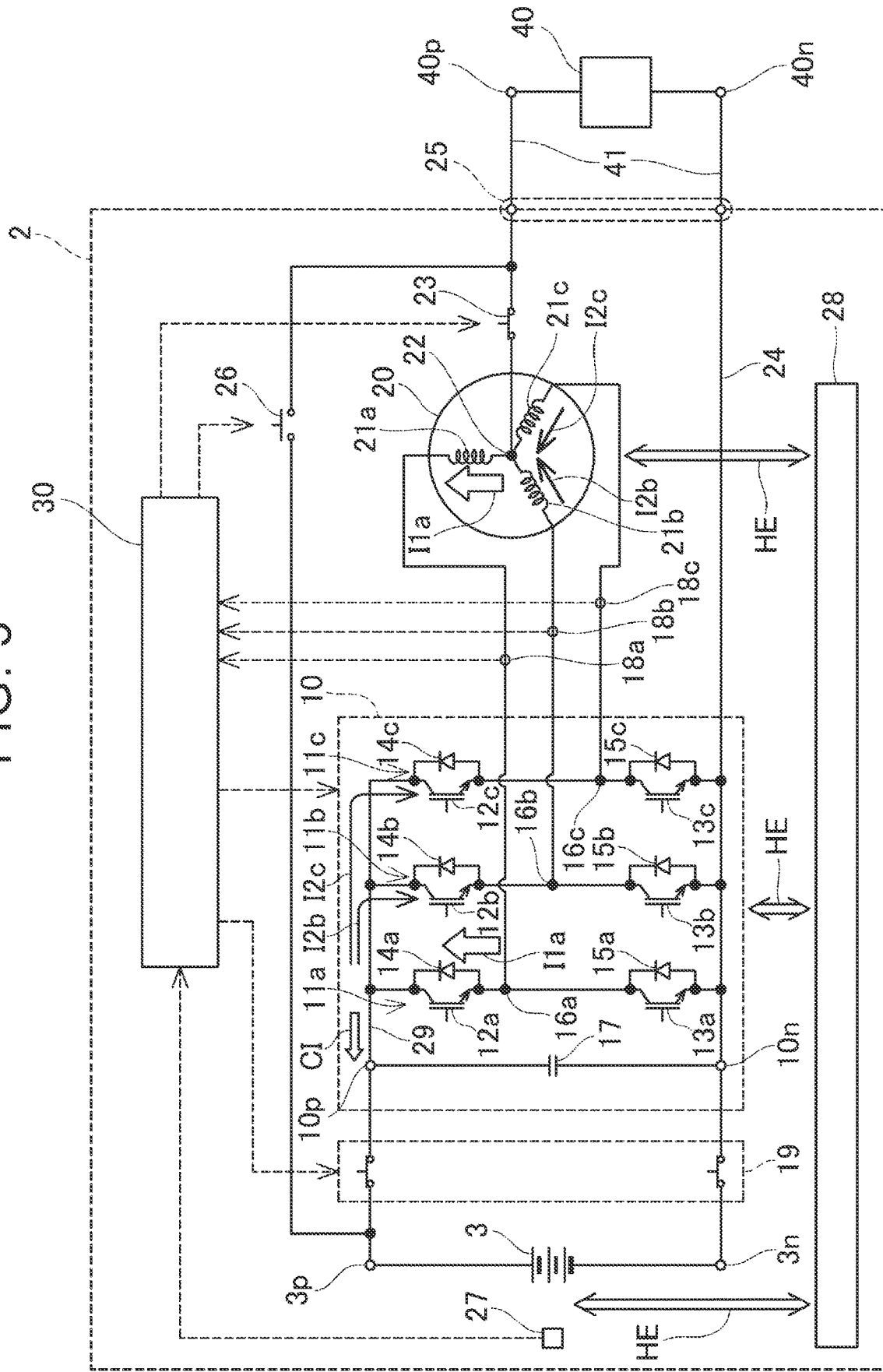
FIG. 3 is a block diagram illustrating the heat generation charging operation.

In the example of FIG. 3, control is performed so that the first current I1a flows through the coil 21a, and the second currents I2b and I2c flow through the coils 21b and 21c. Specifically, the controller 30 appropriately controls on/off the lower switching element 13a through which the first current I1a flows. Thereby, a boosting operation is performed by the boosting circuit including the coil 21a, the lower switching element 13a, and the diode 14a. Note that at this time, the upper switching element 12a may also be controlled to be turned on and off as appropriate. At the same time, the upper switching elements 12b and 12c through which the second currents I2b and I2c flow are controlled to be turned on and off as appropriate. This causes the second currents I2b and I2c to flow back to the neutral point 22 via the upper switching elements 12b and 12c.

The first current I1a flowing into the high-potential wiring 29 via the diode 14a is divided into a charging current CI, a second current I2b, and a second current I2c. The charging current CI flows to the battery 3, and charging is performed. The second currents I2b and I2c flow back to the electric motor 20 via the upper switching elements 12b and 12c. At the neutral point 22, second currents I2b and I2c join the first current I1a.

The effect of heat generation charging operation will be explained. In the heat generation charging operation, compared to the normal charging operation, the charging current CI that charges the battery 3 is the same, but second currents I2b and I2c are additionally generated. The circulating second currents I2b and I2c are wasteful currents that do not contribute to charging, and cause heat loss in the inverter 10 and the electric motor 20. Note that the amount of heat generated is maximum in the current path of the first current I1a, which is the maximum current. Heat generated due to losses in the inverter 10 and the electric motor 20 is recovered by the thermal management system 28 and transferred to the battery 3. Thereby, the battery 3 can be heated.

A method for determining the values of the first current I1a, second currents I2b and I2c will be explained. It is preferable to use the maximum allowable current value in each phase of the inverter 10 and the electric motor 20 as the first current I1a. By using the maximum allowable current value instead of the steady-state allowable current value, losses can be maximized. Therefore, since the amount of heat generated can be maximized, it is possible to increase the heating capacity of the battery 3. By subtracting the charging current CI from the first current I1a, the total current value of the second currents I2b and I2c can be determined. Then, by equally dividing the total current value, each of the second currents I2b and I2c can be obtained. In the example of FIG. 3, the first current I1a is 400 A, the charging current CI is 200 A, and the second currents I2b and I2c are each 100 A.

Further, during execution of the heat generation charging operation, the controller 30 rotates at least one coil through which the first current I1 flows and another coil through which the second current I2 flows among the three coils 21a to 21c. Control is performed to switch. In the example of FIG. 3, the first state in which the first current I1a flows through the coil 21a and the second currents I2b and I2c flow through the coils 21b and 21c continues for a predetermined period of time. Thereafter, the state is switched to a second state in which the first current I1b flows through the coil 21b and the second currents I2c and I2a flow through the coils 21c and 21a. After the second state continues for a predetermined time, it is switched to a third state in which the first current I1c flows through the coil 21c and the second currents I2a and I2b flow through the coils 21a and 21b. When the third state continues for a predetermined period of time, it returns to the first state, and this operation is repeated thereafter.

This allows the phase that generates the largest amount of heat to be switched in order among the three phases. Even when the value of the first current I1 is set to the maximum allowable current value, it is possible to suppress the coil temperature and the switching element temperature exceeding the upper limit value. Therefore, it is possible to extend the duration of the heat generation charging operation while maximizing the loss.

Operation Flowchart of Charging Process

Figure 4:
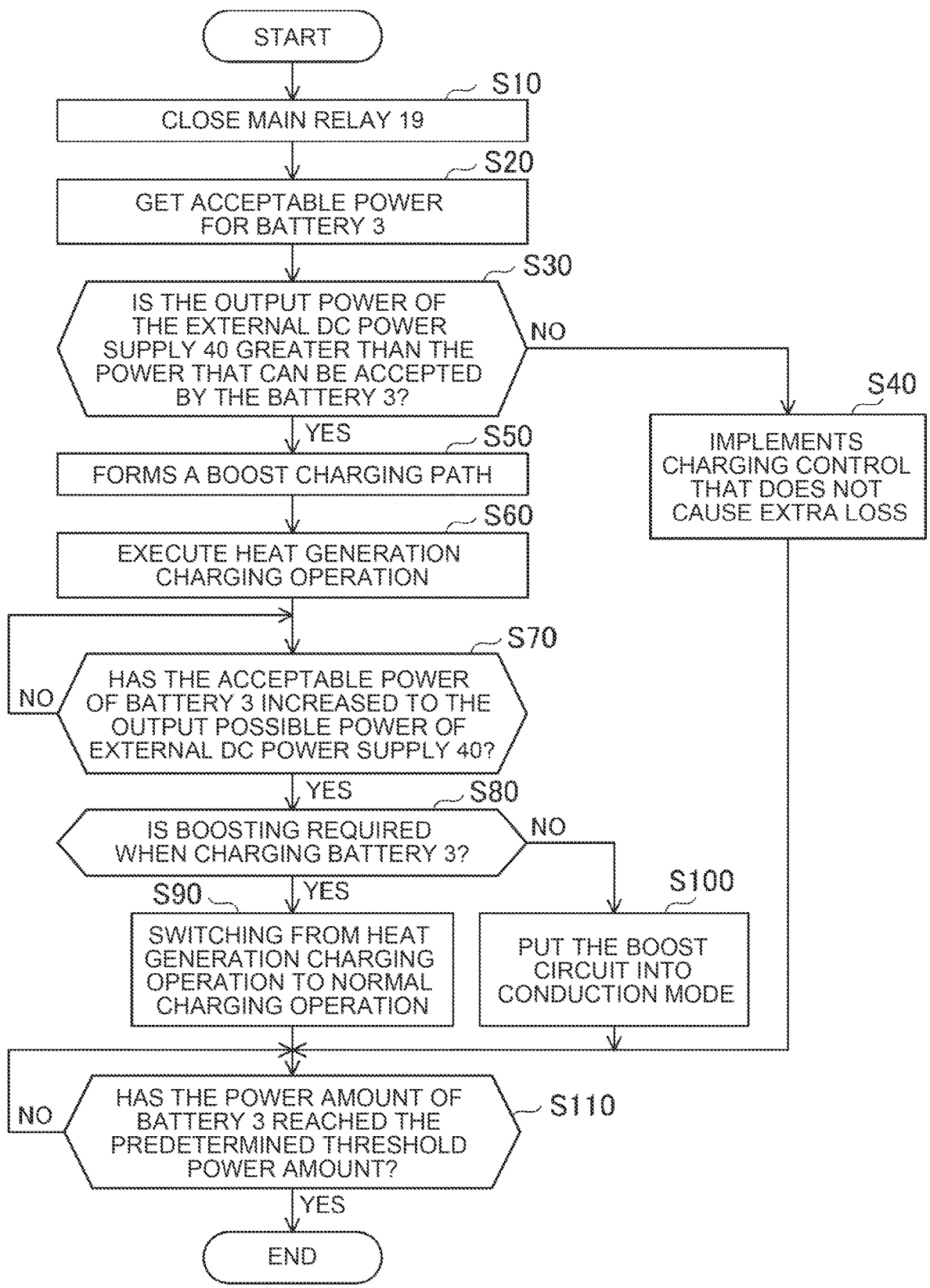
FIG. 4 is a flowchart of the charging process.

FIG. 4 shows a flowchart of the charging process. The charging process by the controller 30 will be described with reference to FIG. 4. When the power cable 41 of the external DC power supply 40 is connected to the charging inlet 25 of the battery electric vehicle 2 and the user turns on a charging switch (not shown), the process shown in FIG. 4 is started. Controller 30 first closes main relay 19 and connects inverter 10 and battery 3 (S10). At this stage, charging relay 23 also remains open.

In S20, the controller 30 obtains the acceptable power of the battery 3. Acceptable power can be calculated based on the temperature of the battery 3, for example. The acceptable power of the battery 3 becomes lower as the temperature of the battery 3 becomes lower. Note that in order to suppress performance deterioration of the battery 3 due to lithium precipitation, it is necessary to charge the battery 3 with less than acceptable power.

In S30, the controller 30 determines whether the outputtable power of the external DC power supply 40 is greater than the acceptable power of the battery 3. In other words, it is determined whether the acceptable power of the battery 3 is lower than the outputtable power of the external DC power supply 40 due to a decrease in the temperature of the battery 3.

If it is determined that the acceptable power of the battery 3 is greater than the outputtable power of the external DC power supply 40 (S30: NO), the process advances to S40. In S40, the controller 30 performs charging control that does not cause extra loss. A specific description will be given. The controller 30 compares the voltage of the battery 3 and the voltage of the external DC power supply 40 in magnitude. If the voltage of the battery 3 is higher, it is determined that boosting is necessary during charging. Therefore, charging relay 23 is closed and the above-mentioned normal charging operation is performed. On the other hand, if the voltage of external DC power supply 40 is higher, it is determined that boosting is not necessary during charging. Therefore, the bypass relay 26 is closed and the battery 3 is directly charged from the external DC power supply 40. Then, the process advances to S110.

On the other hand, if it is determined in S30 that the outputtable power of the external DC power supply 40 is larger than the acceptable power of the battery 3 (S30: YES), the battery 3 is heated by generating extra loss. It is determined that it is necessary to do so, and the process advances to S50. In S50, the controller 30 closes the charging relay 23 and forms a boost charging path. In S60, the controller 30 executes the above-described heat generation charging operation. Thereby, the temperature of the battery 3 can be increased by transferring heat generated due to extra loss to the battery 3 side.

In S70, the controller 30 determines whether the acceptable power of the battery 3 has increased to the output possible power of the external DC power supply 40. If the determination is negative (S70: NO), the heat generation charging operation is continued. On the other hand, if an affirmative determination is made (S70: YES), it is determined that the temperature of the battery 3 has risen sufficiently and the heat generation charging operation is no longer necessary, and the process proceeds to S80.

In S80, the controller 30 determines whether boosting the voltage is necessary when charging the battery 3. If the voltage of the battery 3 is higher than the voltage of the external DC power supply 40, it is determined that boosting is necessary (S80: YES), and the process proceeds to S90. In S90, the controller 30 switches the operation from the heat generation charging operation to the normal charging operation. Then, the process advances to S110.

On the other hand, if the voltage of external DC power supply 40 is higher than the voltage of battery 3, it is determined that boosting is not necessary during charging (S80: NO), and the process proceeds to S100. In S100, controller 30 puts the booster circuit into conduction mode. Specifically, the external DC power supply 40 is directly connected to the battery 3 by turning on the upper switching elements 12a-12c. Thereby, the battery 3 can be charged without boosting the voltage.

In S110, the controller 30 determines whether the power amount of the battery 3 has reached a predetermined threshold power amount. If the determination is negative (S110: NO), charging continues. On the other hand, if the determination is affirmative (S110: YES), the controller 30 opens the charging relay 23 and ends the charging process.

Effects

Conventional battery electric vehicles require a heater to heat the battery and a space to install the heater, which may increase the vehicle's physique and increase manufacturing costs. According to the battery electric vehicle 2 of the present specification, extra loss can be generated by the heat generation charging operation. Therefore, the amount of heat loss generated by the inverter 10 and the electric motor 20 can be transferred to the battery 3 via the thermal management system 28. Since the battery 3 can be heated using existing parts without providing a separate heater or the like, it is possible to suppress increases in manufacturing costs and increase in body size.

In the battery electric vehicle 2 of this specification, the controller 30 obtains the acceptable power of the battery 3 based on the temperature of the battery 3 (S20). Then, when the outputtable power of the external DC power supply 40 is larger than the acceptable power of the battery 3 (S30: YES), the heat generation charging operation can be performed (S60). Thereby, when the acceptable power is limited due to a decrease in the temperature of the battery 3, it becomes possible to charge the battery appropriately by heating the battery through the heat generation charging operation.

Although the specific examples have been described in detail above, these are merely examples and do not limit the scope of claims. The techniques described in the claims include various modifications and alternations of the specific example illustrated above. The technical elements described in the present specification or the drawings exhibit technical usefulness alone or in various combinations, and are not limited to the combinations described in the claims at the time of filing. In addition, the techniques illustrated in the present specification or drawings can achieve a plurality of objectives at the same time, and achieving one of the objectives itself has technical usefulness.

MODIFICATIONS

In the heat generation charging operation, the number of coils through which the first current I1 flows is not limited to one, but may be two. In this case, the second current I2 may be controlled to flow through the remaining one coil.

The term "battery electric vehicle" as used herein may also include a hybrid electric vehicle that includes a battery, an inverter, an electric motor, and an engine. That is, the technique of the embodiment is also suitable for application to a hybrid electric vehicle.

What is claimed is:

1. A battery electric vehicle comprising:
   a battery;
   an inverter that includes three arm circuits, in each of which an upper switching element connected to a positive electrode of the battery and a lower switching element connected to a negative electrode of the battery are connected in series;
   a motor that includes three coils, one end of each of which is connected to a neutral point and another end of each of which is connected to a midpoint of a corresponding one of the three arm circuits;
   a relay that connects between the neutral point and a positive electrode of an external power supply;
   a ground wire that connects between the negative electrode of the battery and a negative electrode of the external power supply; and
   a controller configured to perform control so as to independently turn on and off three lower switching elements and three upper switching elements, and to be capable of charging the battery by boosting a voltage of the external power supply, wherein:
   the controller is capable of selectively executing normal charging operation and heat generation charging operation;
   in the normal charging operation, an equal current flows in all the three coils in a positive direction from the neutral point toward the arm circuit; and
   in the heat generation charging operation, a first current flows in the positive direction in at least one of the three coils, and a second current flows in an opposite direction from the arm circuit toward the neutral point in another coil of the three coils, a total value of the first current being greater than a total value of the second current.

2. The battery electric vehicle according to claim 1, wherein the controller is configured to:
   when executing the normal charging operation, perform control so as to turn on and off the lower switching element in all the three arm circuits; and
   when executing the heat generation charging operation, perform control so as to turn on and off the lower switching element in at least one of the three arm circuits, and so as to turn on and off the upper switching element in another arm circuit of the three arm circuits.

3. The battery electric vehicle according to claim 1, wherein the controller is configured to switch the at least one of the three coils through which the first current flows and the another coil of the three coils through which the second current flows on a rotating basis during execution of the heat generation charging operation.

4. The battery electric vehicle according to claim 1, further comprising a temperature sensor that measures a temperature of the battery, wherein the controller is configured to:
   acquire acceptable power of the battery based on the temperature of the battery; and
   execute the heat generation charging operation when outputtable power of the external power supply is greater than the acceptable power.

5. The battery electric vehicle according to claim 1, further comprising a thermal management system capable of transmitting heat of the motor and the inverter to the battery.

* * * * *